US012764704B2

(12) United States Patent
Oteri et al.

(10) Patent No.: US 12,764,704 B2
(45) Date of Patent: Oct. 13, 2026

(54) SYNCHRONIZATION AND RESOURCE ALLOCATION FOR SIDELINK POSITIONING

(71) Applicant: Apple Inc., Cupertino, CA (US)

(72) Inventors: Oghenekome Oteri, San Diego, CA (US); Sigen Ye, San Diego, CA (US); Dawei Zhang, Saratoga, CA (US); Wei Zeng, San Diego, CA (US); Chunxuan Ye, San Diego, CA (US); Weidong Yang, San Diego, CA (US); Haitong Sun, Cupertino, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 18/451,578

(22) Filed: Aug. 17, 2023

(65) Prior Publication Data

US 2024/0114476 A1 Apr. 4, 2024

Related U.S. Application Data

(60) Provisional application No. 63/412,027, filed on Sep. 30, 2022.

(51) Int. Cl.

*H04W 64/00* (2009.01)
*H04W 48/20* (2009.01)
*H04W 72/25* (2023.01)

(52) U.S. Cl.

CPC ........... *H04W 64/00* (2013.01); *H04W 48/20* (2013.01); *H04W 72/25* (2023.01)

(58) Field of Classification Search

CPC ..... H04W 48/20; H04W 64/00; H04W 72/00; H04W 72/02; H04W 72/04; H04W 72/25; H04W 72/30; H04W 72/40; H04W 76/28

(Continued)

(56) References Cited

U.S. PATENT DOCUMENTS 11,778,585 B2 * 10/2023 Wu ..................... H04L 27/0006 370/329
11,917,619 B2 * 2/2024 Wu ........................ H04W 76/14

(Continued)

FOREIGN PATENT DOCUMENTS

CA 3225597 A1 * 3/2023 .............. H04W 4/02
EP 3780882 B1 * 10/2025 .............. H04W 8/22

(Continued)

OTHER PUBLICATIONS

International Search Report for PCT/US2023/030596; Dec. 18, 2023.

*Primary Examiner* — Jean A Gelin

(74) *Attorney, Agent, or Firm* — Kowert, Hood, Munyon, Rankin & Goetzel, P.C.

(57) ABSTRACT

Apparatuses, systems, and methods for synchronization and resource allocation for sidelink positioning, e.g., in 5G NR systems and beyond. A device, e.g., a UE or an LMF, may be configured to transmit, to a plurality of wireless devices, an anchor selection request for a sidelink positioning procedure for a target UE. The device may be configured to receive, from one or more wireless devices of the plurality of wireless devices, an anchor selection response. The device may be configured to select based, at least in part, on the anchor selection responses, one or more anchor devices from the one or more wireless devices.

20 Claims, 13 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 12,058,641 | B2 * | 8/2024 | Lee | H04W 64/00 |
| 2003/0021274 | A1 * | 1/2003 | Siikaniemi | H04W 8/22<br>370/392 |
| 2017/0212206 | A1 * | 7/2017 | Kim | G01S 5/0205 |
| 2018/0332564 | A1 * | 11/2018 | Lee | H04L 67/12 |
| 2022/0015057 | A1 * | 1/2022 | Bao | H04W 76/14 |
| 2022/0039052 | A1 * | 2/2022 | Choi | G01S 13/765 |
| 2022/0394659 | A1 * | 12/2022 | Vassilovski | H04W 8/24 |
| 2023/0276401 | A1 * | 8/2023 | Reddy | H04W 64/00<br>455/456.1 |
| 2023/0403569 | A1 * | 12/2023 | Hirzallah | H04W 64/00 |
| 2024/0188009 | A1 * | 6/2024 | Park | H04W 56/0015 |
| 2024/0334535 | A1 * | 10/2024 | Yerramalli | H04W 64/00 |
| 2025/0048316 | A1 * | 2/2025 | Dai | H04W 64/00 |
| 2025/0048407 | A1 * | 2/2025 | Yue | H04W 64/00 |
| 2025/0056481 | A1 * | 2/2025 | Keshavamurthy | H04W 64/00 |
| 2025/0293834 | A1 * | 9/2025 | Liu | H04L 5/0051 |

FOREIGN PATENT DOCUMENTS

| | | | | |
|---|---|---|---|---|
| EP | 4668921 A1 * | 12/2025 | | H04W 92/18 |
| WO | 2022150090 | 7/2022 | | |

* cited by examiner

SYNCHRONIZATION AND RESOURCE ALLOCATION FOR SIDELINK POSITIONING

PRIORITY DATA

This application claims benefit of priority to U.S. Provisional Application Ser. No. 63/412,027, titled "Synchronization and Resource Allocation for Sidelink Positioning", filed Sep. 30, 2022, which is hereby incorporated by reference in its entirety as though fully and completely set forth herein.

FIELD

The invention relates to wireless communications, and more particularly to apparatuses, systems, and methods for synchronization and resource allocation for sidelink positioning, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for synchronization and resource allocation for sidelink positioning, e.g., in 5G NR systems and beyond.

For example, in some embodiments, a device, e.g., a user equipment device (UE) or a location management function (LMF), may be configured to transmit, to a plurality of wireless devices (e.g., such as sidelink UEs, PRUs, and other such devices), an anchor selection request for a sidelink positioning procedure for a target UE. The device may be configured to receive, from one or more wireless devices of the plurality of wireless devices, an anchor selection response. The device may be configured to select based, at least in part, on the anchor selection responses, one or more anchor devices from the one or more wireless devices. Additionally, to select, based, at least in part, on the anchor selection responses, the one or more anchor devices from the one or more wireless devices, the device may select the one or more anchor devices based on one or more of UE synchronization type, relative position of an anchor UE to the target UE, mobility, and/or signal quality.

As another example, in some embodiments, a UE may be configured to transmit, to a plurality of wireless devices (e.g., such as sidelink UEs, PRUs, and other such devices), an anchor selection request for a sidelink positioning procedure for the UE. The UE may be configured to receive, from one or more wireless devices of the plurality of wireless devices, an anchor selection response via a physical layer in sidelink control information (SCI) or medium access control (MAC) control element (CE). The UE may be configured to select based, at least in part, on the anchor selection responses, one or more anchor devices from the one or more wireless devices. Additionally, to select, based, at least in part, on the anchor selection responses, the one or more anchor devices from the one or more wireless devices, the UE may select the one or more anchor devices based on one or more of UE synchronization type, relative position of an anchor UE to the target UE, mobility, and/or signal quality.

As a further example, in some embodiments, an LMF may be configured to transmit, to a plurality of wireless devices (e.g., such as sidelink UEs, PRUs, and other such devices), an anchor selection request for a sidelink positioning procedure for a target UE. The LMF may be configured to receive, from one or more wireless devices of the plurality of wireless devices, an anchor selection response via a higher layer using a sidelink Long Term Evolution (LTE) positioning protocol (LPP). The LMF may be configured to select based, at least in part, on the anchor selection responses, one or more anchor devices from the one or more wireless devices. Additionally, to select, based, at least in part, on the anchor selection responses, the one or more anchor devices from the one or more wireless devices, the LMF may select the one or more anchor devices based on one or more of UE synchronization type, relative position of an anchor UE to the target UE, mobility, and/or signal quality.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
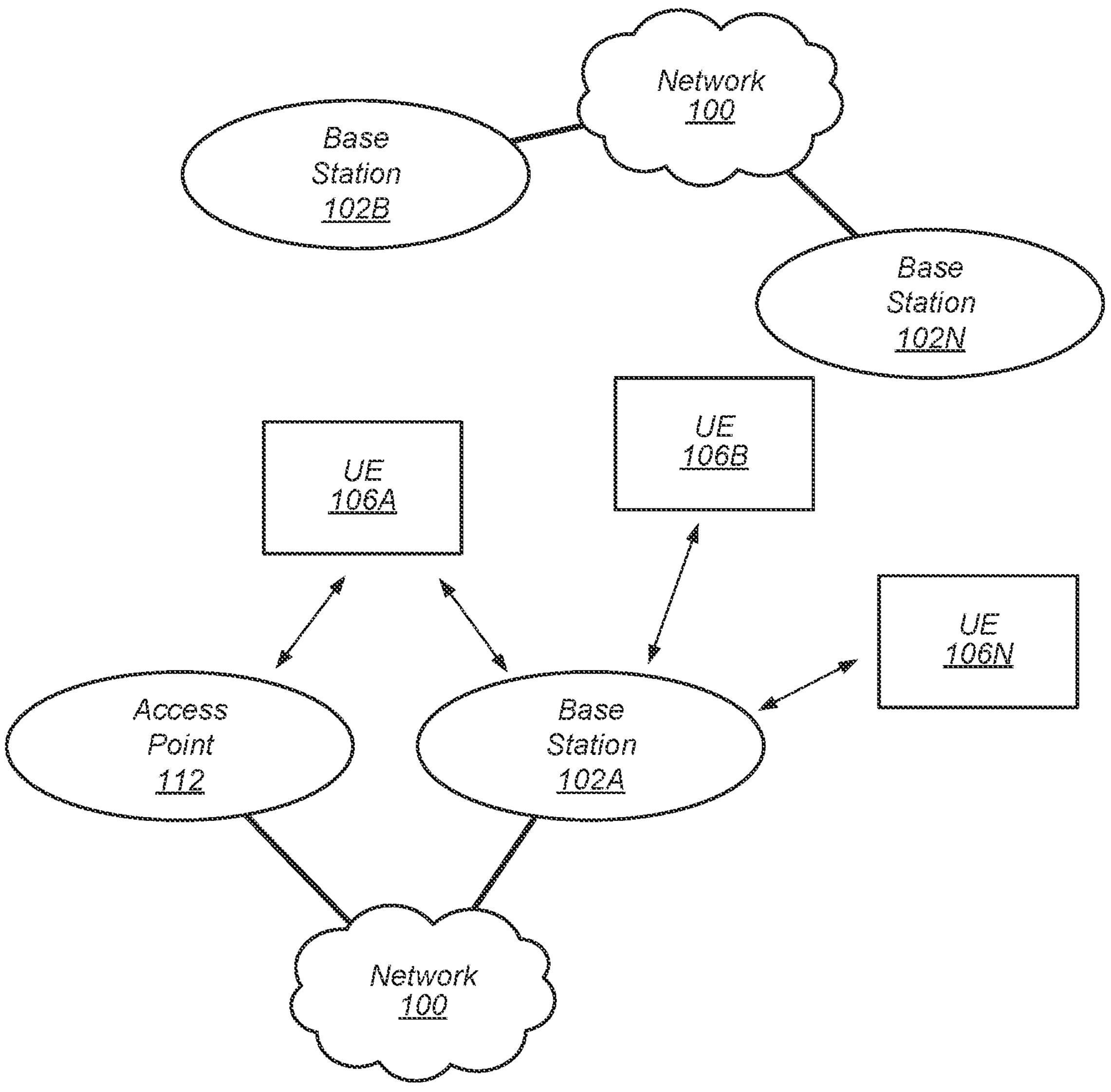
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
PDCCH: Physical Downlink Control Channel
PDSCH: Physical Downlink Shared Channel
RRC: Radio Resource Control

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1: Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

In addition, the UE 106 may be in communication with an access point 112, e.g., using a wireless networking (e.g., Wi-Fi) and/or peer-to-peer wireless communication protocol (e.g., Bluetooth, Wi-Fi peer-to-peer, etc.). The access point 112 may provide a connection to the network 100.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
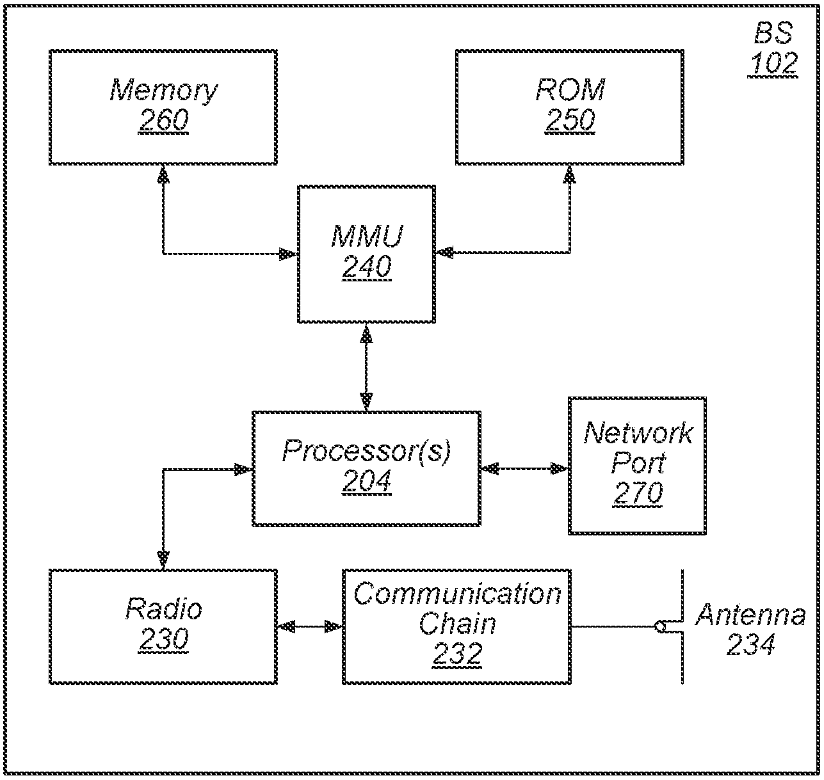
FIG. 2 illustrates an example block diagram of a base station, according to some embodiments.

FIG. 2: Block Diagram of a Base Station

FIG. 2 illustrates an example block diagram of a base station 102, according to some embodiments. It is noted that the base station of FIG. 2 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

Figure 3:
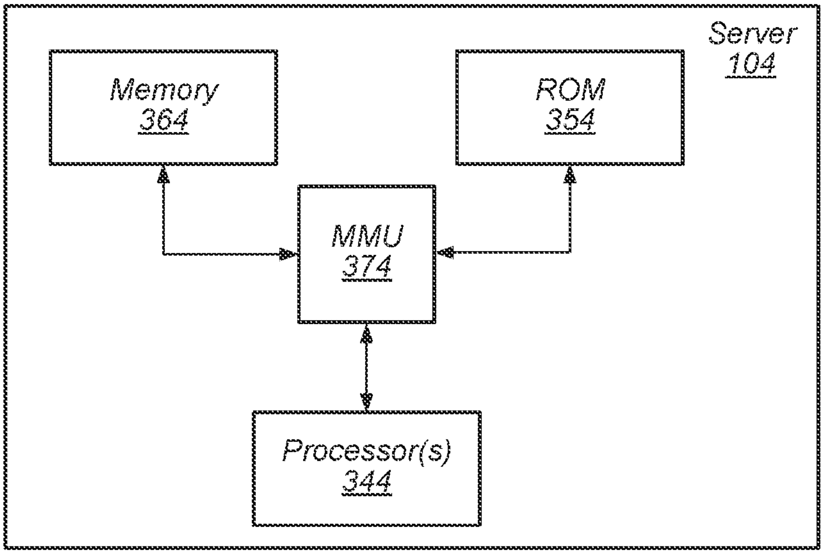
FIG. 3 illustrates an example block diagram of a server, according to some embodiments.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
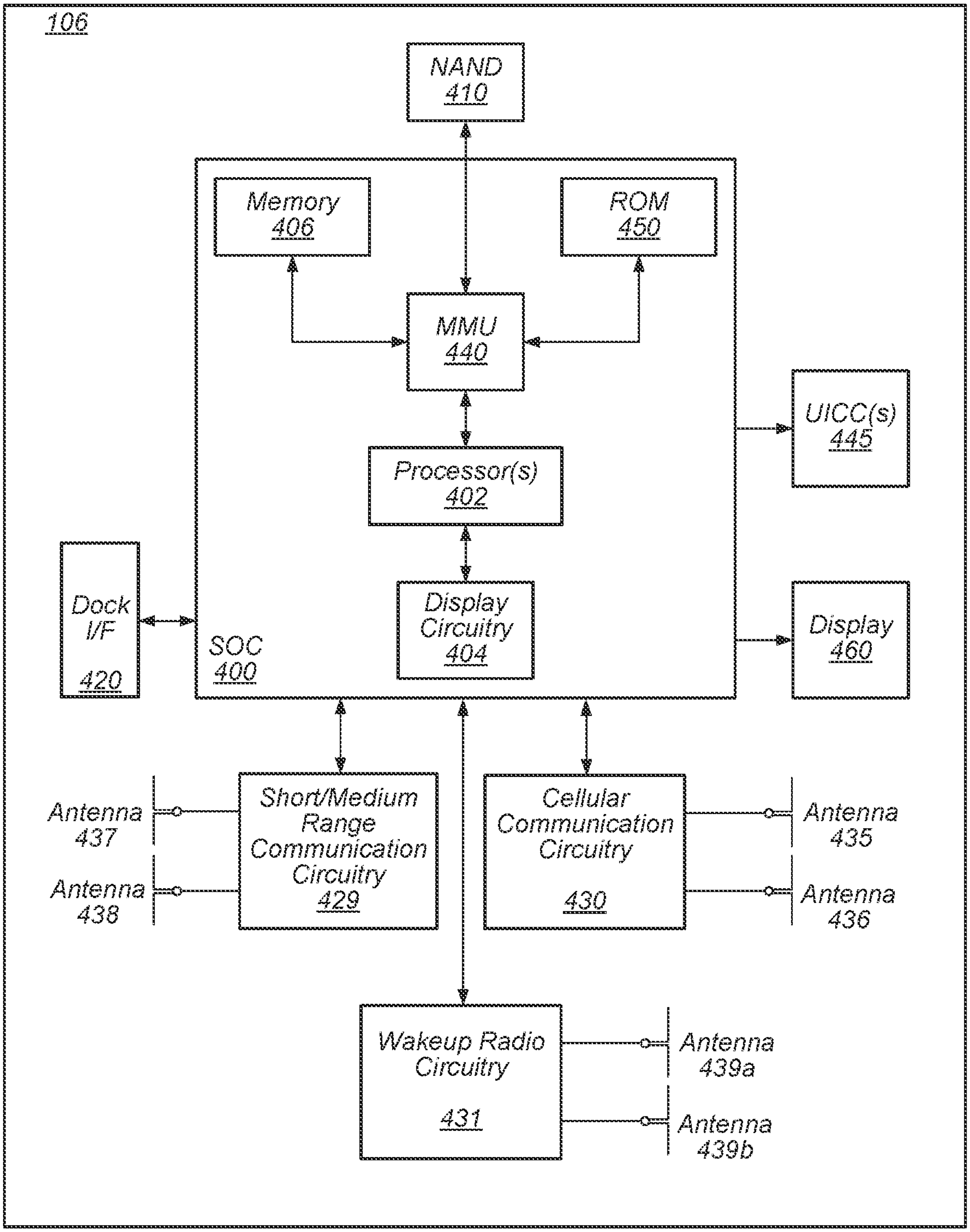
FIG. 4 illustrates an example block diagram of a UE, according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes.

Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., short to medium range wireless communication circuitry 429 (e.g., Bluetooth™ and WLAN circuitry), and wakeup radio circuitry 431. In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The wakeup radio circuitry 431 may also couple (e.g., communicatively; directly or indirectly) to one or more antennas, such as antennas 439*a* and 439*b* as shown. Alternatively, the wakeup radio circuitry 431 may couple (e.g., communicatively; directly or indirectly) to the antennas 435 and 436 in addition to, or instead of, coupling (e.g., communicatively; directly or indirectly) to the antennas 439*a* and 439*b*. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration. The wakeup radio circuitry 431 may include a wakeup receiver, e.g., wakeup radio circuitry 431 may be a wakeup receiver. In some instances, wakeup radio circuitry 431 may be a low power and/or ultra-low power wakeup receiver. In some instances, wakeup radio circuitry may only be powered/active when cellular communication circuitry 430 and/or the short to medium range wireless communication circuitry 429 are in a sleep/no power/inactive state. In some instances, wakeup radio circuitry 431 may monitor (e.g., periodically) a specific frequency/channel for a wakeup signal. Receipt of the wakeup signal may trigger the wakeup radio circuitry 431 to notify (e.g., directly and/or indirectly) cellular communication circuitry 430 to enter a powered/active state.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term “SIM” or “SIM entity” is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as “SIM cards”), and/or the SIMs 410 may be one or more embedded cards (such as embedded UICCs (eUICCs), which are sometimes referred to as “eSIMs” or “eSIM cards”).

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for synchronization and resource allocation for sidelink positioning, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
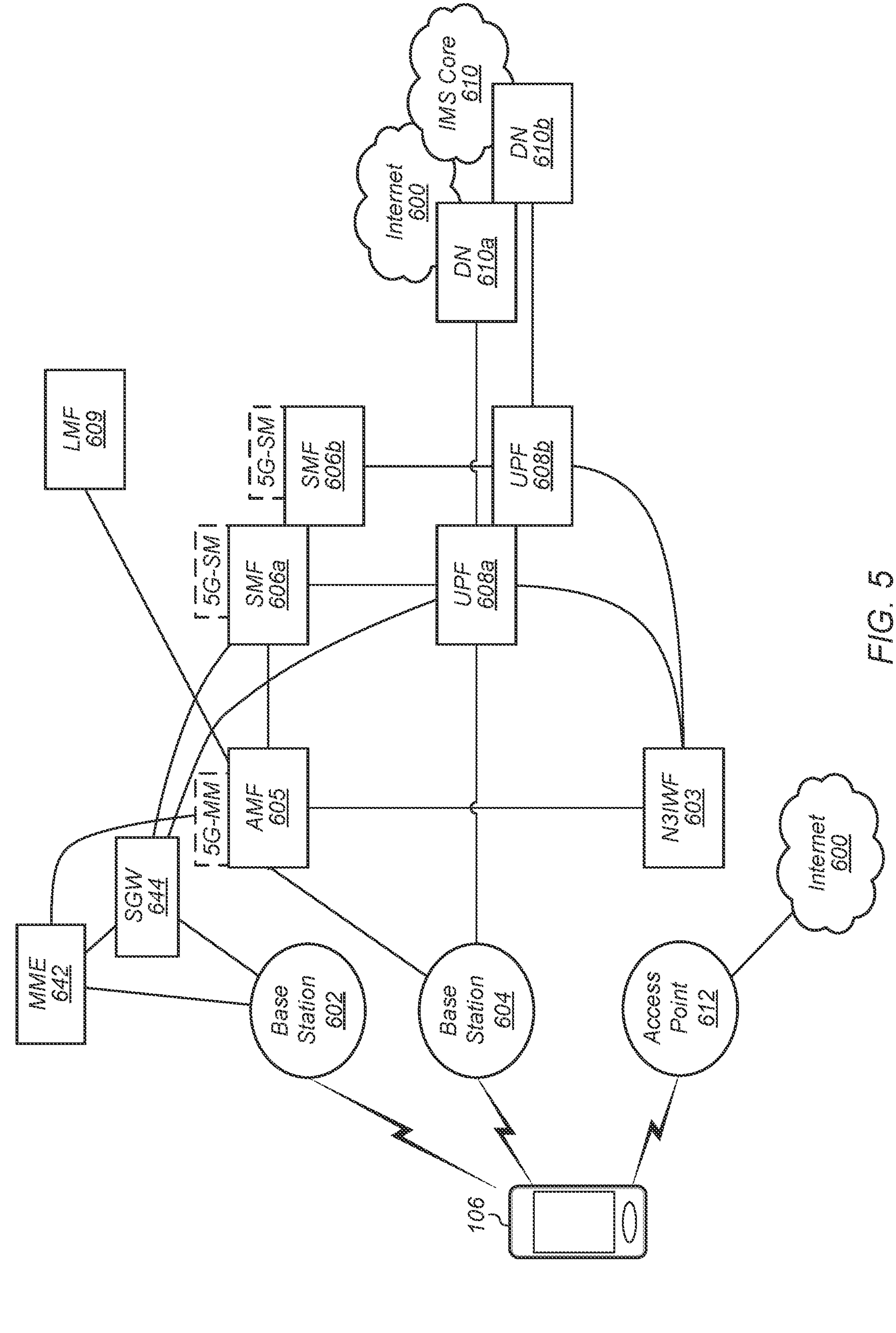
FIG. 5 illustrates an example of a 5G network architecture that incorporates both dual 3GPP (e.g., LTE and 5G NR) access and non-3GPP access to the 5G CN, according to some embodiments.

FIG. 5: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 5 illustrates an example of a 5G network architecture that incorporates both dual 3GPP (e.g., cellular access via LTE and 5G-NR) and non-3GPP (e.g., non-cellular) access to the 5G CN, according to some embodiments. As shown, a user equipment device (e.g., such as UE 106) may access the 5G CN through both a radio access network (RAN, e.g., such as gNB 604 or eNB 602, each of which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include functional entities associated with the 5G CN (e.g., such as a network slice selection function (NSSF), a short message service function 622, an application function (AF), unified data management (UDM), a policy control function (PCF), and/or an authentication server function. Note that these functional entities may also be supported by a session management function (SMF) 606*a* and an SMF 606*b* of the 5G CN. The AMF 605 may be connected to (or in communication with) the SMF 606*a*. Further, the gNB 604 may in communication with (or connected to) a user plane function (UPF) 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and Internet Protocol (IP) Multimedia Subsystem/IP Multimedia Core Network Subsystem (IMS) core network 610.

Note that in various embodiments, one or more of the above-described entities may be configured to perform methods for synchronization and resource allocation for sidelink positioning, e.g., in 5G NR systems and beyond, e.g., as further described herein.

Synchronization and Resource Allocation for Sidelink Positioning

In current implementations, methods for sidelink positioning in cellular systems, e.g., such as NR cellular systems have not been defined and/or agreed upon. However, it has been agreed upon to study sidelink positioning measurement methods based on RTT-type solutions, angle of arrival (AoA) based solutions (including both Azimuth of arrival and Zenith of arrival), time-different of arrival (TDoA) based solutions, and angle of departure (AoD) based solutions (including both Azimuth of departure and Zenith of departure). Further, it has been agreed upon that studies should include aspects such as definition(s) of corresponding sidelink measurements for each method, which methods may be applicable to absolute or relative positioning or ranging, antenna configuration consideration(s) using practical UE capabilities, per-panel location, e.g., if a UE uses multiple panels, a UE's mobility, especially for V2X scenarios, impact of synchronization error(s) between UEs, and whether existing sidelink measurements (e.g. such as reference signal receive power (RSRP) and/or received signal strength indicator (RSSI)) and UE identity (ID) information may be used.

In some implementations, such as TDoA based solutions, an impact of synchronization errors between UEs has not been addressed. Note that in current sidelink (e.g., as standardized by 3GPP) a UE needs to be synchronized to have a common view from the time domain and a UE can use various sources (references) for synchronization, including global navigation satellite system (GNSS) based, network based via a Uu link using synchronization signal blocks (SSB) transmitted from base stations, and sidelink SSB based via a link with a synchronization reference UE. GNSS and network-based synchronization are considered as the highest-quality sources followed by synchronization reference UEs, which are synchronized either directly or indirectly to GNSS or the network.

Figure 6:
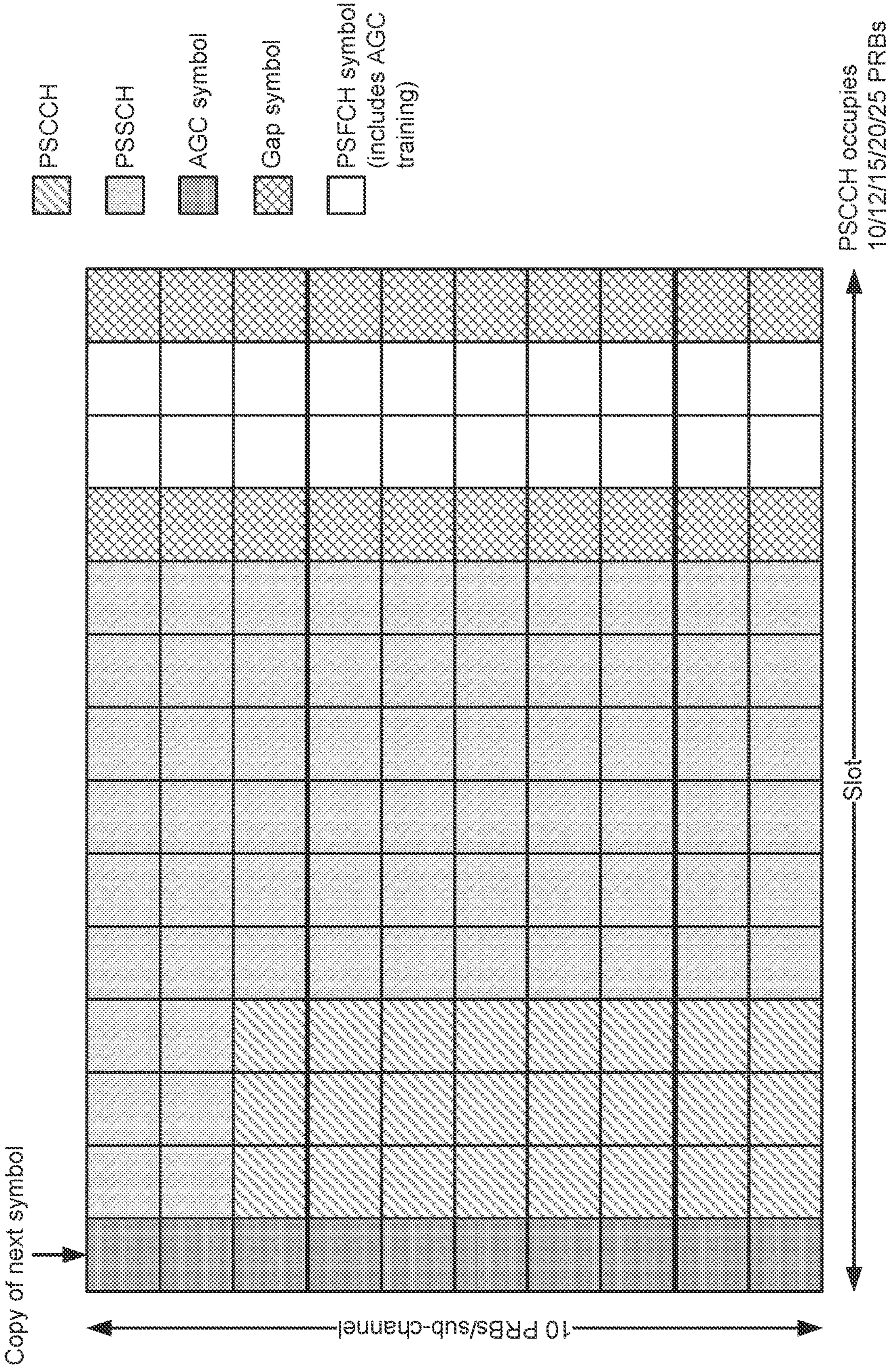
FIG. 6 (Prior Art)
FIG. 6 illustrates an example of a sidelink resource pool.

Further, for current implementations of a physical sidelink shared channel (PSSCH), the PSSCH occupies an entire time-frequency resource after sidelink control information (SCI) and before a physical sidelink feedback channel (PSFCH). Thus, if a shared resource pool is used, there may be a backwards compatibility issue and no resource to transmit a sidelink positioning reference signal (SL-PRS), e.g., as illustrated by FIG. 6. As shown, currently implementations of sidelink does not include any extra resources for transmitting additional signaling, such as a SL-PRS.

Embodiments described herein provide systems, methods, and mechanisms for synchronization and resource allocation for sidelink positioning, including systems, methods, mechanisms for synchronization error compensation for sidelink TDoA methods and for addressing resources for SL-PRS transmission. For example, regarding synchronization error compensation, a common synchronization reference for anchor UEs may be identified. Additionally, methods and mechanisms for changing anchor UEs to a common synchronization reference may be defined. Further, methods and mechanisms to estimate a difference in synchronization due to different synchronization references and compensation for the difference in synchronization may be defined. As an example, the compensation may be based on analysis of the difference and/or an LMF/UE may request a synchronization error estimation procedure between UEs in question (e.g., one of the UEs in question may send a test signal, such as a sidelink SSB or a SL-PRS, to the other UE in question and the other UE in question may use the test signal to estimate a synchronization delta or synchronization difference).

Figure 7:
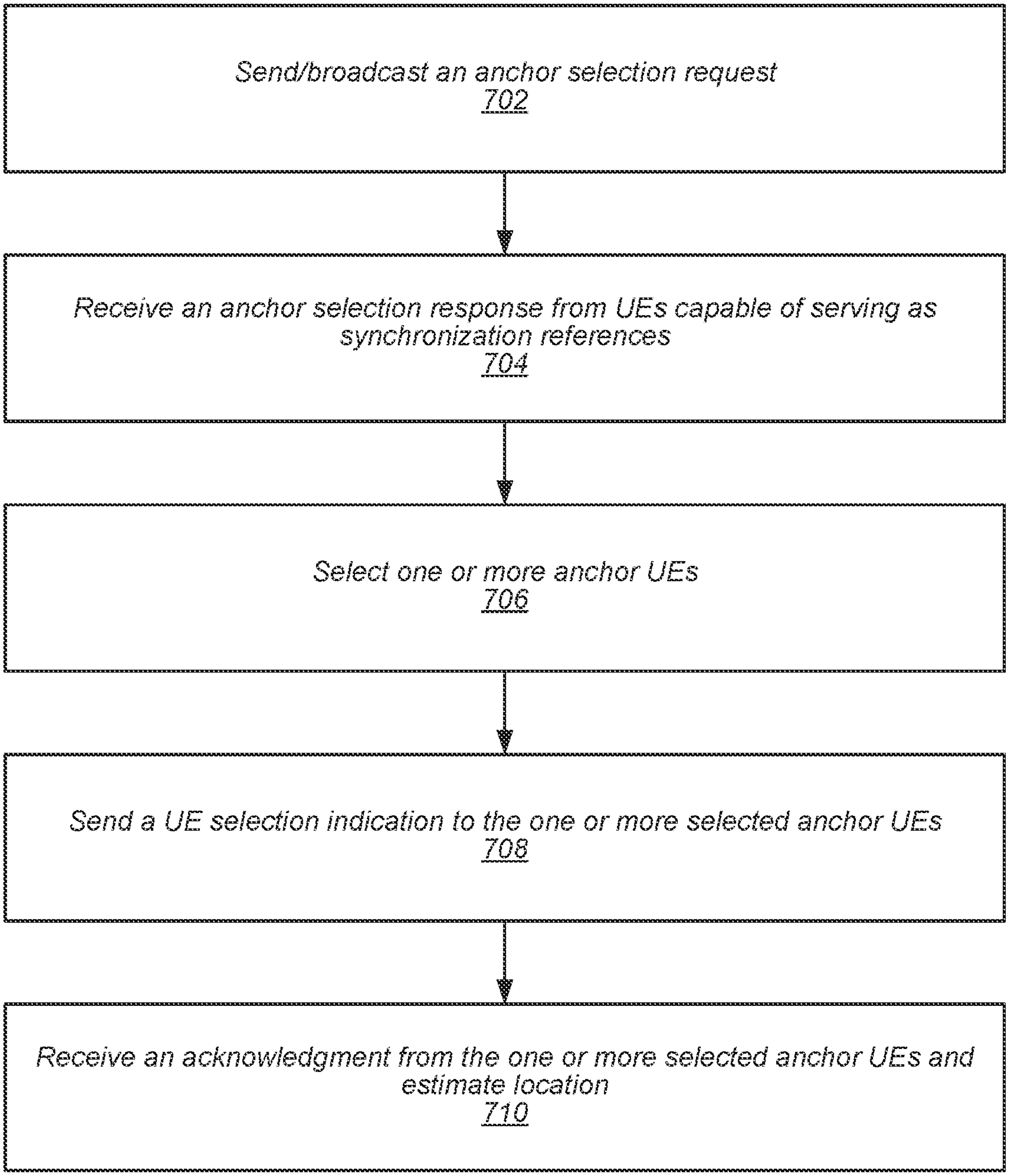
FIG. 7 illustrates a block diagram of an example of a method for common synchronization reference selection, according to some embodiments.

For example, in some instances, to identify a common synchronization reference, e.g., for sidelink TDoA positioning, a target UE and/or a location management function (LMF) may initiate an anchor UE selection procedure, e.g., as illustrated by FIG. 7. FIG. 7 illustrates a block diagram of an example of a method for common synchronization reference selection, according to some embodiments. The method shown in FIG. 7 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 702, the target UE and/or LMF may send and/or broadcast an anchor selection request. The anchor selection request may be sent on a physical layer, e.g., in a sidelink control information (SCI) and/or on a higher layer, e.g., such as using a sidelink LTE positioning protocol (LPP) when the LMF is sending/broadcasting the anchor selection request. The anchor selection request may include any of a preferred sidelink positioning type, such as TDoA, round trip time (RTT), and so forth, a request for UE-based or non-UE based positioning, a priority of a synchronization reference preferred for selection, a last known position of the target UE, and/or a change in position of the target UE since the last known position.

At 704, the target UE/LMF may receiving an anchor selection response from UEs capable of serving as synchronization references. The anchor selection response may be received on the physical layer, e.g., on a physical sidelink shared channel (PSSCH) and/or in a dedicated slot for positioning, such as on a positioning physical sidelink feedback channel (PSFCH), or on the higher layer, e.g., using sidelink LPP. The anchor selection response may include any of a unique UE identifier (e.g., UE ID), a UE synchronization type, such as GNSS, SSB ID (for UEs in coverage), and/or sidelink SSB ID (for UEs not in coverage), an anchor capability, a sidelink positioning type, such as TDoA, RTT, and so forth, a capability associated with synchronization switching (e.g., a capability indicating whether a UE is open to switching synchronization sources), and/or a location availability indication (e.g., an indication of whether the UE has a location and an indication of quality of location, e.g., whether the location is based on a positioning reference unit (PRU), a base station, or a high capability UE and/or whether the UE is moving at a speed relative to the target UE).

At 706, the target UE/LMF may select one or more anchor UEs, e.g., based, at least in part, on the anchor selection responses received from the UEs capable of serving as synchronization references. The one or more anchor UEs may be selected based on one or more of UE synchronization type, relative positions of anchor UEs to the target UE (e.g., to ensure intersecting hyperbola), anchor mobility, and/or signal quality. Note that regarding synchronization type, GNSS may be preferred over SSB, SSB may be preferred over sidelink SSB, and sidelink SSB may be preferred over UE based synchronization. In some instances, the target UE/LMF may only select anchor UEs with identical synchronization reference. In some instances, the target UE/LMF may request a possible anchor UE to switch to a different synchronization reference. In some instances, the target UE/LMF may select anchor UEs with different synchronization references. In such instances, the target UE/LMF may request a synchronization delta estimate between specific possible anchor UEs. The target UE/LMF may then use the synchronization delta estimate to correct for any synchronization differences between anchor UEs. Alternatively, the target UE/LMF may modify a positioning procedure to accommodate the different synchronization references.

At 708, the target UE/LMF may send a UE selection indication to the one or more selected anchor UEs. In some instances, if the target UE sends the UE selection indication, the target UE may also send an indication to the LMF regarding the selected anchor UE (or UEs). The indication may be sent on the physical layer or via sidelink LPP.

At 710, the target UE/LMF may receive an acknowledgment from the one or more selected anchor UEs and estimate location. The acknowledgment may be received on the physical layer or via sidelink LPP.

Figure 8:
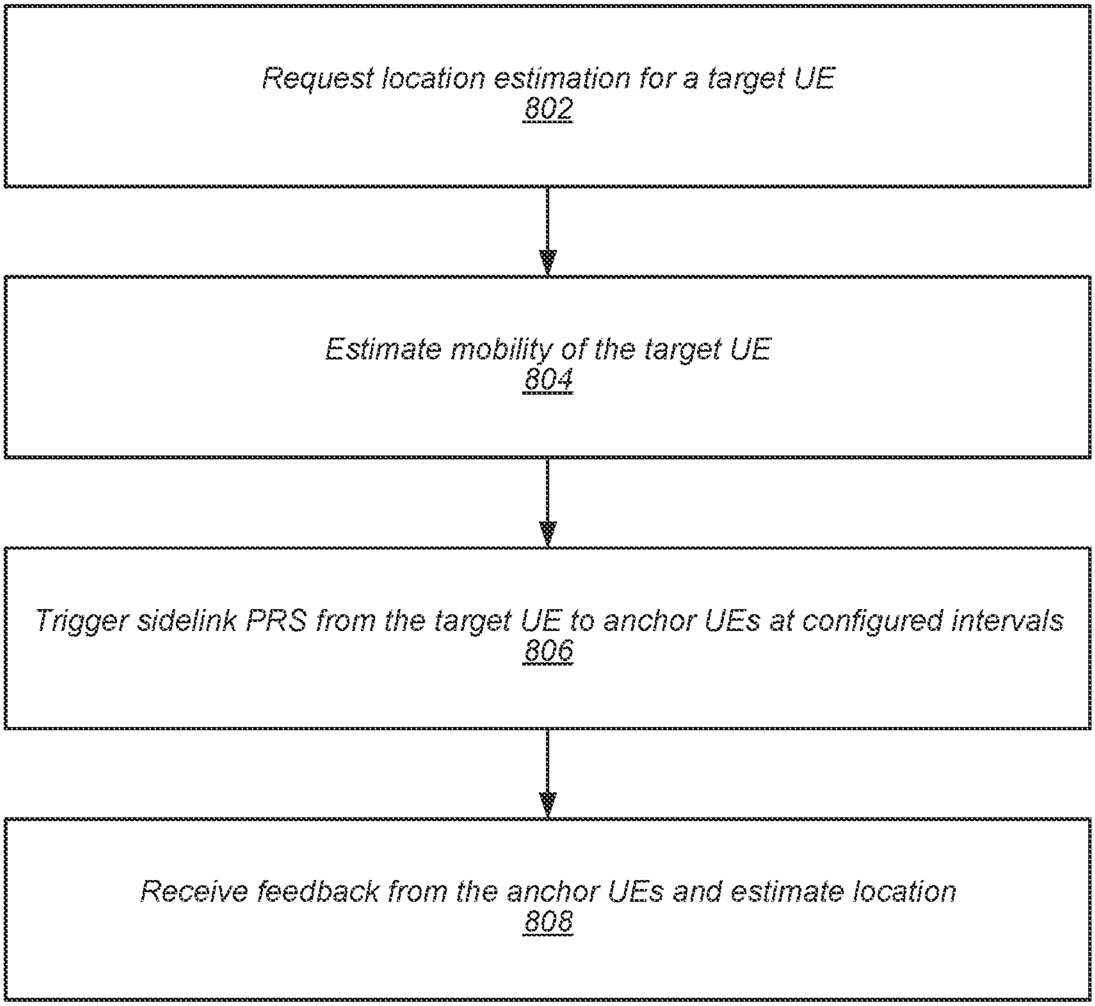
FIG. 8 illustrates a block diagram of an example of a method for estimating a difference due to different synchronization references, according to some embodiments.

In some instances, to estimate a difference due to different synchronization references and compensate for the difference, a target UE may transmit a positioning reference signal from multiple positions to one or more anchor UEs, e.g., when the UE is mobile. In such instances, the one or more anchor UEs may estimate time stamps of received positioning reference signals and positions can be determined. For example, FIG. 8 illustrates a block diagram of an example of a method for estimating a difference due to different synchronization references, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a target UE and/or LMF may request a location estimation for the target UE.

At 804, mobility of the target UE may be estimated. In some instances, the target UE may indicate that it is mobile or will be mobile based on a trigger or location request. In some instances, a base station or LMF may estimate Doppler from a physical channel to determine mobility.

At 806, based on the target UE being mobile, the LMF (e.g., a sidelink LMF) may trigger a sidelink positioning reference signal (PRS) at a configured interval from the target UE to anchor UEs. Additionally, the LMF may request timestamp of arrival for sidelink PRSs at all the anchor UEs.

At 808, the LMF may receive feedback for the multiple sidelink PRSs from the anchor UEs. Location can then be estimated, even with non-synchronized anchors.

Figure 9:
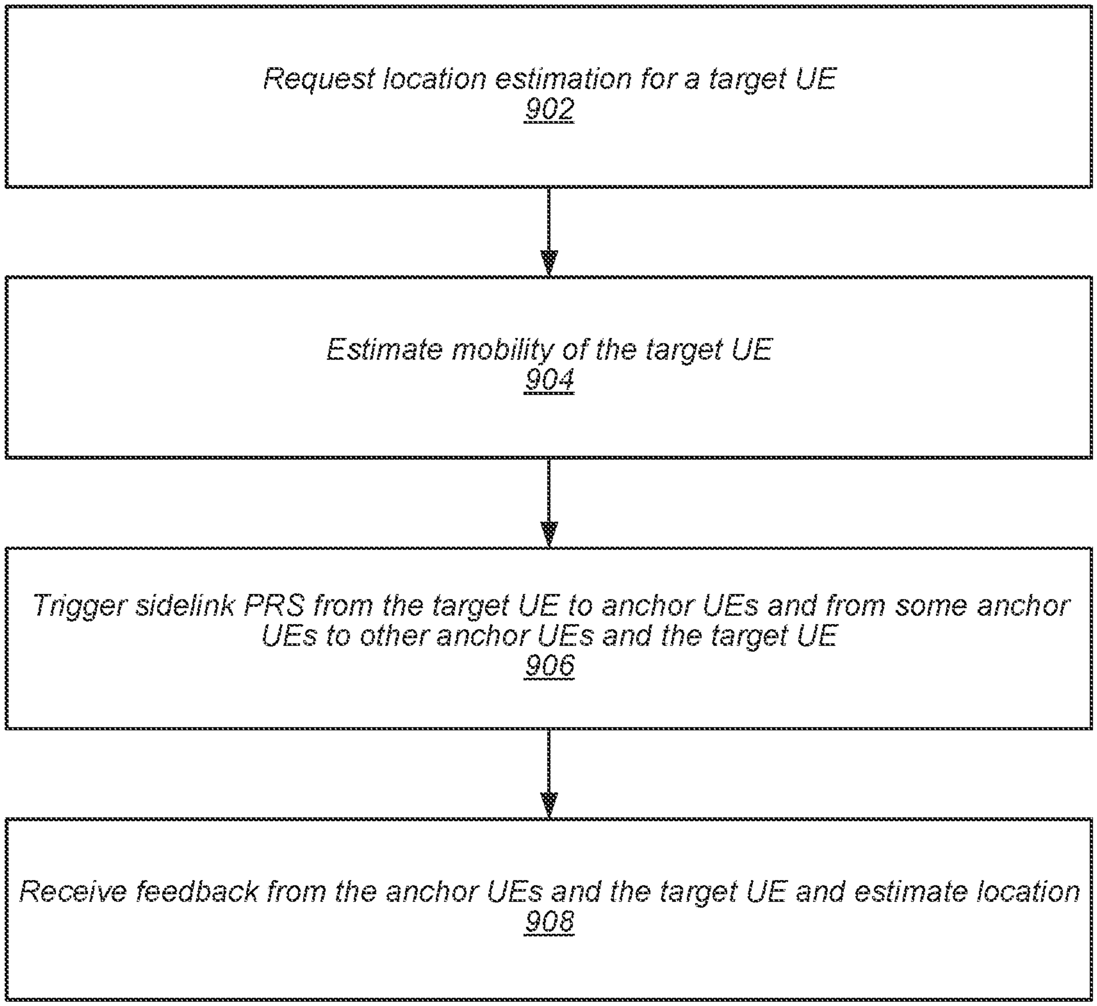
FIG. 9 illustrates a block diagram of another example of a method for estimating a difference due to different synchronization references, according to some embodiments.

In some instances, to estimate a difference due to different synchronization references and compensate for the difference, a target UE may transmit a positioning reference signal and then an anchor UE may transmit a synchronization estimation reference signal, e.g., when the UE is stationary. For example, FIG. 9 illustrates a block diagram of another example of a method for estimating a difference due to different synchronization references, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a target UE and/or LMF may request a location estimation for the target UE.

At 904, mobility of the target UE may be estimated. In some instances, the target UE may indicate that it is not mobile or will not be mobile based on a trigger or location request. In some instances, a base station or LMF may estimate Doppler from a physical channel to determine mobility.

At 906, based on determining that the target UE is not mobile, the LMF may trigger a sidelink PRS sent from the target UE to one or more anchor UEs and sidelink PRSs and/or sidelink SSB s from a subset of the one or more anchor UES to other anchor UEs and the target UE.

At 908. the LMF may receive feedback, including time stamps for all received signals, from the one or more anchor UEs and the target UE and estimate location of the target UE.

In some instances, with regards to sidelink positioning resource allocation, no shared resource pool(s) with sidelink communication may be allowed.

In some instances, with regards to sidelink positioning resource allocation, a resource pool type may be based, at least in part, on one or more of a sidelink UE type and/or a sidelink positioning reference signal (PRS) type. For example, as illustrated by Table 1, a resource pool may not be shared if either a receiving UE or a transmitting UE is not a 3GPP Release 18 capable UE.

TABLE 1

Resource Pool Type Determination

| Transmitter Type | Receiver Type | Resource Pool Type |
| --- | --- | --- |
| 3GPP Release 16/17 capable UE | 3GPP Release 16/17 capable UE | Not shared |
| 3GPP Release 16/17 capable UE | 3GPP Release 18 and above capable UE | Not shared |
| 3GPP Release 18 and above capable UE | 3GPP Release 16/17 capable UE | Not shared |
| 3GPP Release 18 and above capable UE | 3GPP Release 18 and above capable UE | Shared |

In some instances, a UE may indicate whether it is a 3GPP Release 16/17 capable UE or a 3GPP Release 18 and above capable UE via a UE capability indication. Thus, based on the UE capability indication, if one of the UEs in a communication is not 3GPP Release 18 and above capable UE, then a shared resource pool may not be used and a 3GPP Release 16/17 capable UE may not expect to receive a transmission with a shared resource pool. Conversely, based on the UE capability indication, if both of the UEs in a communication are 3GPP Release 18 and above capable UE, then a shared resource pool may be used.

Figure 10A:
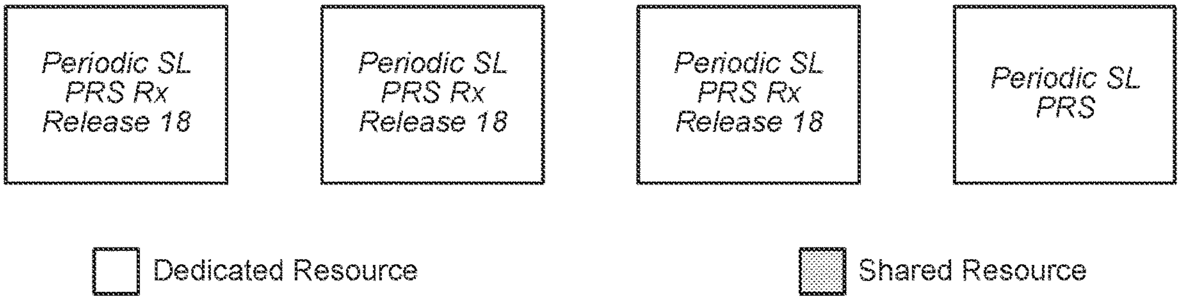
FIGS. 10A, 10B, and 10C illustrate examples of transmitting and not transmitting a periodic or semi-persistent sidelink resource configured as a shared resource, according to some embodiments.
Figure 10B:
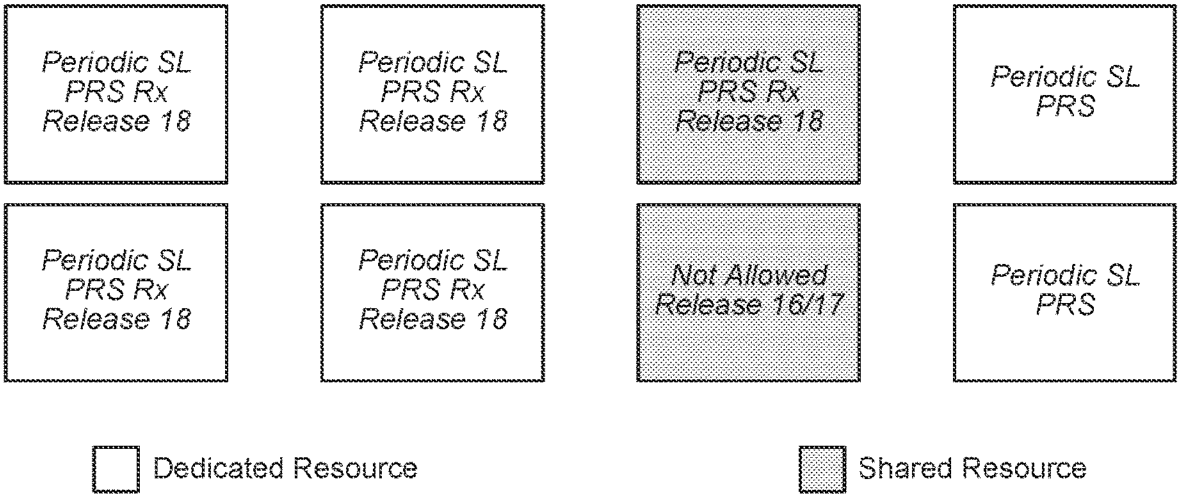
Figure 10C:
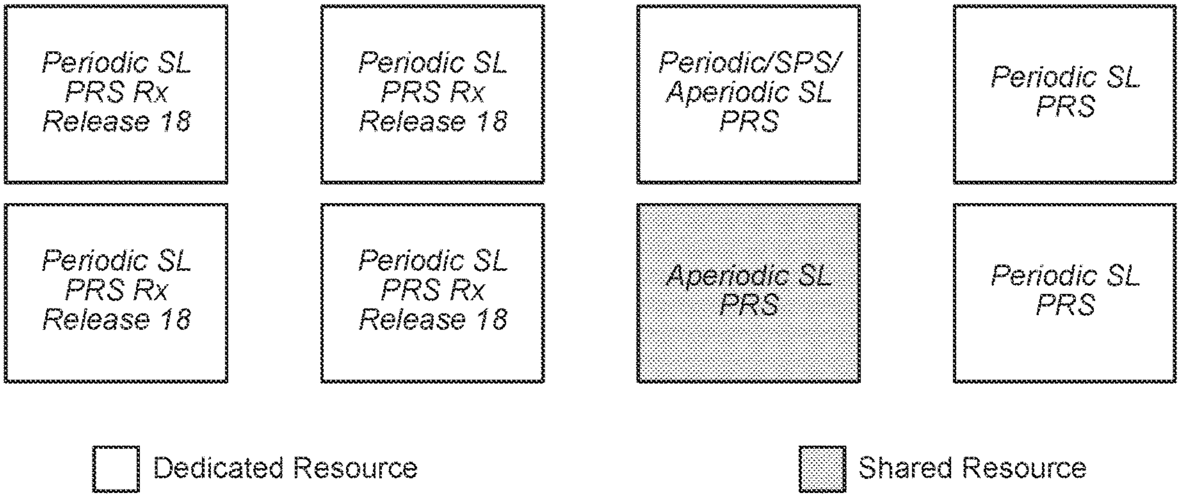

In some instances, e.g., in the case of a periodic or semi-persistent sidelink resource configured as a shared resource, there may be no transmission to a 3GPP Release 16/17 UE when a positioning reference signal (PRS) is transmitted (which may be controlled by a base station), e.g., as illustrated by FIG. 10A. In some instances, in the case of a periodic or semi-persistent sidelink resource configured as a shared resource, a sidelink PRS may not be transmitted if there is a transmission to a 3GPP Release 16/17 UE, e.g., as illustrated by FIG. 10B. Note that a flag may be placed in a reserved bit in a sidelink control information (SCI) stage 1 and/or an SCI stage 2 to indicate that the sidelink PRS is not transmitted. In some instances, in the case of a periodic or semi-persistent sidelink resource configured as a shared resource, a shared resource pool may only be allowed with an aperiodic sidelink PRS and may not be allowed for periodic or semi-persistent sidelink PRS, e.g., as illustrated by FIG. 10C. Note that in the case of an aperiodic sidelink PRS, the sidelink PRS may be placed in a dedicated resource or a shared resource. In some instances, for a shared resource pool, additional signaling may be used to indicate resources that a PSSCH/PSFCH should avoid due to use by a sidelink PRS. For example, such use may be explicitly indicated by an indication of a length or duration of the PSSCH/PSFCH transmission, an indication of a size of the PSSCH/PSFCH, and/or an indication of the resources that should be avoided. Alternatively, such use may be implicitly indicated by a configuration of resources for the sidelink PRS.

Figure 11:
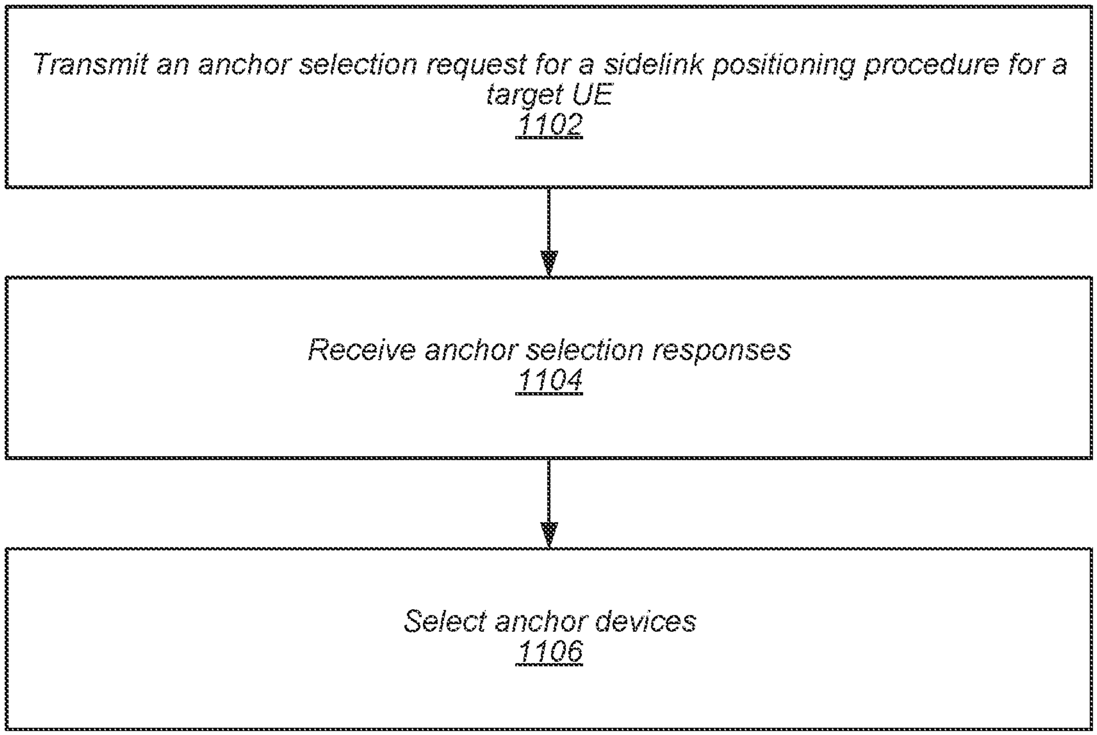
FIGS. 11, 12, and 13 illustrate block diagrams of examples of methods for selecting a synchronization reference for sidelink positioning, according to some embodiments.

FIG. 11 illustrates a block diagram of an example of a method for selecting a synchronization reference for sidelink positioning, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a device, such as a UE 106 and/or an LMF 609, may transmit, to a plurality of wireless devices (e.g., such as sidelink UEs, PRUs, and other such devices), an anchor selection request for a sidelink positioning procedure for a target UE, which may be a UE 106. The anchor selection request may be sent individually to each of the plurality of wireless devices (e.g., as a unicast message) or broadcast to the plurality of wireless devices. Additionally, the anchor selection request may be transmitted via a physical layer in sidelink control information (SCI), via a medium access control (MAC) control element (CE) or via a higher layer using a sidelink Long Term Evolution (LTE) positioning protocol (LPP). The anchor selection request may include one or more of a preferred sidelink positioning type, a request for UE based or non-UE based positioning, a priority of a synchronization reference preferred for selection, a last known position of the target UE, and/or a change in position of the target UE since the last known position. The preferred sidelink positioning type may include one or more of a time difference of arrival (TDoA) procedure, a round trip time (RTT) procedure, sidelink Angle of Arrival (SL-AoA) procedure, sidelink Angle of Departure (SL-AoD) procedure, and/or sidelink enhanced cell identifier (SL e-CID) procedure.

At 1104, the device may receive, from one or more wireless devices of the plurality of wireless devices, an anchor selection response. In other words, at least a subset of the plurality of wireless devices may respond to the anchor selection request. The anchor selection response may be received via a physical layer channel, a MAC CE, or via a higher layer using a sidelink LPP. The physical layer channel may be a control channel. The control channel may be a physical sidelink control channel (PSCCH or a control channel dedicated for positioning control. The PSCCH may include a dedicated slot for positioning for a sidelink positioning reference signal. The anchor selection response may include one or more of a unique UE identifier, a UE synchronization type, an anchor capability, a sidelink positioning type; a capability associated with synchronization switching, and/or a location availability indication. The UE synchronization type may include one or more of Global Navigation Satellite System (GNSS) based synchronization, synchronization signal block (SSB) based synchronization including an SSB identifier, sidelink SSB including a sidelink SSB identifier, and/or UE based synchronization. The sidelink positioning type may include one or more of TDoA procedure, an RTT procedure, an SL-AoA procedure, an SL-AoD procedure, and/or an SL e-CID procedure. The capability associated with synchronization switching may indicate whether a wireless device is open to switching synchronization sources. Further, the location availability indication may indicate whether a wireless device has a location and an indication of quality of location. In addition, the quality of location may indicate one or more of whether the location is based on a positioning reference unit (PRU), a base station, or a high capability UE and/or whether the wireless device is moving at a speed relative to the target UE.

At 1106, the device may select based, at least in part, on the anchor selection responses, one or more anchor devices from the one or more wireless devices. In some instances, to select, based, at least in part, on the anchor selection responses, the one or more anchor devices from the one or more wireless devices, the device may select the one or more anchor devices based on one or more of UE synchronization type, relative position of an anchor UE to the target UE, mobility, and/or signal quality. The UE synchronization type may include one or more of GNSS based synchronization, SSB based synchronization including an SSB identifier, sidelink SSB including a sidelink SSB identifier, and/or UE based synchronization. Note that GNSS based synchronization may be preferred over SSB based synchronization which may be preferred over sidelink SSB based synchronization which may be preferred over UE based synchronization. In some instances, to select, based, at least in part, on the anchor selection responses, the one or more anchor devices from the one or more wireless devices, the device may select wireless devices with a common synchronization reference as anchor devices.

In some instances, the device may determine that at least one wireless device of the one or more wireless devices has a different synchronization reference than at least one other wireless device of the one or more wireless devices. The device may request that the at least one wireless device switch synchronization references prior to selecting the at least one wireless device as an anchor device.

In some instances, the device may determine that at least one anchor device of the one or more anchor devices (e.g., a plurality of anchor devices) has a different synchronization reference than at least one other anchor device of the one or more anchor devices. The device may request a synchronization delta estimate for the one or more anchor devices. In such instances, received synchronization delta estimates may be used to correct for any synchronization differences amongst the one or more anchor devices.

In some instances, the device may determine that at least one anchor device of the one or more anchor devices (e.g., a plurality of anchor devices) has a different synchronization reference than at least one other anchor device of the one or more anchor devices. The device may modify the sidelink positioning procedure to accommodate differing synchronization references amongst the one or more anchor devices.

In some instances, the device may send, to the one or more anchor devices, a selection indication. The device may receive, from the one or more anchor devices, an acknowledgement. The selection indication may be transmitted via a physical layer, a MAC CE, and/or via a higher layer using a sidelink LPP. Additionally, the acknowledgment may be received via a physical layer, a MAC CE, and/or via a higher layer using a sidelink LPP.

In some instances, the device may be the target UE. In such instances, the device may request a location estimation for the target UE and determine a mobility state of the target UE. In some instances, to determine the mobility state of the target UE, the device may indicate, to a location management function (LMF), that the target UE is mobile or not mobile relative to the one or more anchor devices and/or determine that the target UE is mobile or not mobile relative to the one or more anchor devices based on a trigger or location request. In some instances, when the target UE is mobile relative to the one or more anchor devices, the device may receive, from the LMF, a configuration for transmitting a sequence of sidelink positioning reference signals (PRS s) at a predetermined interval to the one or more anchor devices. Further, the device may transmit, to the one or more anchor devices, the sequence of sidelink PRSs at the predetermined interval. In some instances, to determine that the target UE is not mobile relative to the one or more anchor devices, the device may determine that the target UE is not moving. In some instances, to determine that the target UE is not mobile relative to the one or more anchor devices, the device may determine that the target UE is moving, that the one or more anchor devices are moving, and that the target UE and the one or more anchor devices are static with respect to one another. In some instances, when the target UE is not mobile relative to the one or more anchor devices, the device may receive, from the LMF, a configuration for transmitting a sidelink PRS to each of the one or more anchor devices. Further, the device may transmit, to each of the one or more anchor devices, the sidelink PRS.

In some instances, the device may be an LMF. In such instances, the device may request a location estimation for the target UE and determine a mobility state of the target UE. In some instances, to determine the mobility state of the target UE, the device may determine that the target UE is mobile or not mobile relative to the one or more anchor devices based on estimating Doppler from a physical channel. In some instances, the mobility may be estimated based on external sensors. In some instances, when the target UE is mobile relative to the one or more anchor devices, the device may transmit, to the target UE, a configuration for transmitting a sequence of sidelink PRSs at a predetermined interval to the one or more anchor devices. Further, the device may transmit, to the one or more anchor devices, a request for timestamp of arrival for received sidelink PRSs from the target UE and receive, from the one or more anchor devices, feedback associated with the received sidelink PRSs from the target UE. Additionally, the device may estimate the location of the target UE based of the feedback. The feedback may include the requested timestamp of arrival for received sidelink PRSs from the target UE. In some instances, to determine that the target UE is not mobile relative to the one or more anchor devices, the device may determine that the target UE is not moving. In some instances, to determine that the target UE is not mobile relative to the one or more anchor devices, the device may determine that the target UE is moving, that the one or more anchor devices are moving, and that the target UE and the one or more anchor devices are static with respect to one another. In some instances, when the target UE is not mobile relative to the one or more anchor devices, the device may transmit, to the target UE, a configuration for transmitting a sidelink PRS to each of the one or more anchor devices. Further, the device may transmit, to the one or more anchor devices, a request for timestamp of arrival for received sidelink PRSs from the target UE and receive, from the one or more anchor devices, feedback associated with the received sidelink PRSs from the target UE. Additionally, the device may estimate the location of the target UE based of the feedback. The feedback may include the requested timestamp of arrival for received sidelink PRSs from the target UE.

In some instances, a time-frequency resource allocation for sidelink positioning may be based, at least in part, one or more of capability of a participating device and/or a sidelink PRS type. In some instances, when a capability of a participating device indicates that the participating device is capable of supporting a shared resource pool for sidelink communication as specified in 3GPP Release 18 and beyond, a resource pool may be shared for communications with the participating device. In some instances, the device may transmit, to the participating device, a first UE capability indicating whether or not the device is capable of supporting a shared resource pool for sidelink communication as specified in 3GPP Release 18 and beyond and receive, from the participating device, a second UE capability indicating whether or not the participating device is capable of supporting a shared resource pool for sidelink communication as specified in 3GPP Release 18 and beyond. Additionally, when the device and the participating device are both capable of supporting a shared resource pool for sidelink communication as specified in 3GPP Release 18 and beyond, the device may use a shared resource pool for communication with the participating device. Further, when the device or the participating device is not capable of supporting a shared resource pool for sidelink communication as specified in 3GPP Release 18 and beyond, the device may not use a shared resource pool for communication with the participating device.

In some instances, for a shared resource pool, additional signaling may be used to indicate resources that a PSSCH/PSFCH should avoid due to use by a sidelink PRS. For example, such use may be explicitly indicated by an indication of a length or duration of the PSSCH/PSFCH transmission, an indication of a size of the PSSCH/PSFCH, and/or an indication of the resources that should be avoided. Alternatively, such use may be implicitly indicated by a configuration of resources for the sidelink PRS.

In some instances, when a periodic or semi-persistent sidelink resource is configured as a shared resource, a sidelink PRS may be not be transmitted to participating devices that are not capable of supporting a shared resource pool for sidelink communication as specified in 3GPP Release 18 and beyond. In some instances, when a periodic or semi-persistent sidelink resource is configured as a shared resource, a sidelink PRS may not be transmitted when at least one participating device is not capable of supporting a shared resource pool for sidelink communication as specified in 3GPP Release 18 and beyond. The non-transmission of the sidelink PRS may be indicated in a sidelink control information (SCI) stage 1 and/or an SCI stage 2. In addition, a reserved bit in the SCI stage 1 and/or SCI stage 2 may indicate the non-transmission of the sidelink PRS. In some instances, when a periodic or semi-persistent sidelink resource is configured as a shared resource, only an aperiodic sidelink PRS may be transmitted in the shared resource.

Figure 12:
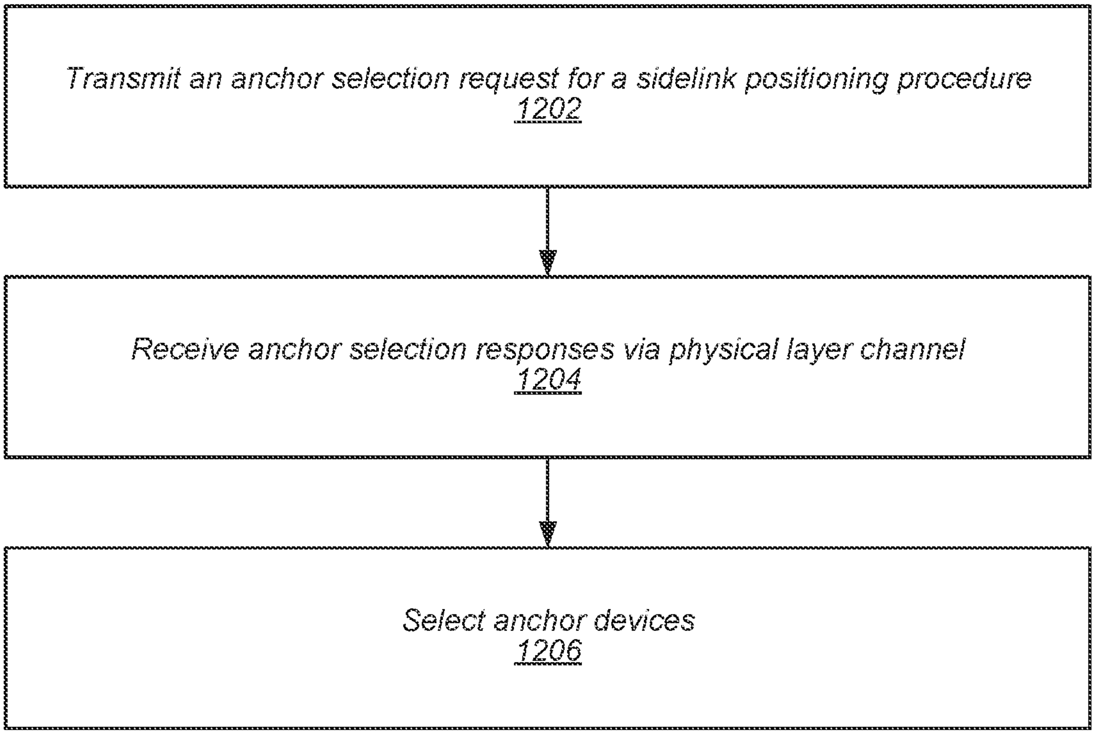

FIG. 12 illustrates a block diagram of another example of a method for selecting a synchronization reference for sidelink positioning, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as a UE 106, may transmit, to a plurality of wireless devices (e.g., such as sidelink UEs, PRUs, and other such devices), an anchor selection request for a sidelink positioning procedure for the UE, which may be considered a target UE. The anchor selection request may be transmitted via a physical layer in sidelink control information (SCI) and/or via a MAC CE. The anchor selection request may be sent individually to each of the plurality of wireless devices (e.g., as a unicast message) or broadcast to the plurality of wireless devices. The anchor selection request may include one or more of a preferred sidelink positioning type, a request for UE based or non-UE based positioning, a priority of a synchronization reference preferred for selection, a last known position of the target UE, and/or a change in position of the target UE since the last known position. The preferred sidelink positioning type may include one or more of a time difference of arrival (TDoA) procedure, a round trip time (RTT) procedure, sidelink Angle of Arrival (SL-AoA) procedure, sidelink Angle of Departure (SL-AoD) procedure, and/or sidelink enhanced cell identifier (SL e-CID) procedure.

At 1204, the UE may receive, from one or more wireless devices of the plurality of wireless devices, an anchor selection response. In other words, at least a subset of the plurality of wireless devices may respond to the anchor selection request. The anchor selection response may be received via a physical layer channel or a MAC CE. The physical layer channel may be a control channel. The control channel may be a physical sidelink control channel (PSCCH or a control channel dedicated for positioning control. The PSCCH may include a dedicated slot for positioning for a sidelink positioning reference signal. The anchor selection response may include one or more of a unique UE identifier, a UE synchronization type, an anchor capability, a sidelink positioning type; a capability associated with synchronization switching, and/or a location availability indication. The UE synchronization type may include one or more of Global Navigation Satellite System (GNSS) based synchronization, synchronization signal block (SSB) based synchronization including an SSB identifier, sidelink SSB including a sidelink SSB identifier, and/or UE based synchronization. The sidelink positioning type may include one or more of TDoA procedure, an RTT procedure, an SL-AoA procedure, an SL-AoD procedure, and/or an SL e-CID procedure. The capability associated with synchronization switching may indicate whether a wireless device is open to switching synchronization sources. Further, the location availability indication may indicate whether a wireless device has a location and an indication of quality of location. In addition, the quality of location may indicate one or more of whether the location is based on a positioning reference unit (PRU), a base station, or a high capability UE and/or whether the wireless device is moving at a speed relative to the target UE.

At 1206, the UE may select based, at least in part, on the anchor selection responses, one or more anchor devices from the one or more wireless devices. In some instances, to select, based, at least in part, on the anchor selection responses, the one or more anchor devices from the one or more wireless devices, the UE may select the one or more anchor devices based on one or more of UE synchronization type, relative position of an anchor UE to the target UE, mobility, and/or signal quality. The UE synchronization type may include one or more of GNSS based synchronization, SSB based synchronization including an SSB identifier, sidelink SSB including a sidelink SSB identifier, and/or UE based synchronization. Note that GNSS based synchronization may be preferred over SSB based synchronization which may be preferred over sidelink SSB based synchronization which may be preferred over UE based synchronization. In some instances, to select, based, at least in part, on the anchor selection responses, the one or more anchor devices from the one or more wireless devices, the UE may select wireless devices with a common synchronization reference as anchor devices.

In some instances, the UE may determine that at least one wireless device of the one or more wireless devices has a different synchronization reference than at least one other wireless device of the one or more wireless devices. The device may request that the at least one wireless device switch synchronization references prior to selecting the at least one wireless device as an anchor device.

In some instances, the UE may determine that at least one anchor device of the one or more anchor devices (e.g., a plurality of anchor devices) has a different synchronization reference than at least one other anchor device of the one or more anchor devices. The device may request a synchronization delta estimate for the one or more anchor devices. In such instances, received synchronization delta estimates may be used to correct for any synchronization differences amongst the one or more anchor devices.

In some instances, the UE may determine that at least one anchor device of the one or more anchor devices (e.g., a plurality of anchor devices) has a different synchronization reference than at least one other anchor device of the one or more anchor devices. The device may modify the sidelink positioning procedure to accommodate differing synchronization references amongst the one or more anchor devices.

In some instances, the UE may send, to the one or more anchor devices, a selection indication. The device may receive, from the one or more anchor devices, an acknowledgement. The selection indication may be transmitted via a physical layer and/or a MAC CE. Additionally, the acknowledgment may be received via a physical layer and/or a MAC CE.

In some instances, the UE may request a location estimation for the target UE and determine a mobility state of the target UE. In some instances, to determine the mobility state of the target UE, the UE may indicate, to a location management function (LMF), that the target UE is mobile or not mobile relative to the one or more anchor devices and/or determine that the target UE is mobile or not mobile relative to the one or more anchor devices based on a trigger or location request. In some instances, when the target UE is mobile relative to the one or more anchor devices, the UE may receive, from the LMF, a configuration for transmitting a sequence of sidelink positioning reference signals (PRS s) at a predetermined interval to the one or more anchor devices. Further, the UE may transmit, to the one or more anchor devices, the sequence of sidelink PRSs at the predetermined interval. In some instances, to determine that the target UE is not mobile relative to the one or more anchor devices, the UE may determine that the target UE is not moving. In some instances, to determine that the target UE is not mobile relative to the one or more anchor devices, the UE may determine that the target UE is moving, that the one or more anchor devices are moving, and that the target UE and the one or more anchor devices are static with respect to one another. In some instances, when the target UE is not mobile relative to the one or more anchor devices, the UE may receive, from the LMF, a configuration for transmitting a sidelink PRS to each of the one or more anchor devices. Further, the UE may transmit, to each of the one or more anchor devices, the sidelink PRS.

In some instances, a time-frequency resource allocation for sidelink positioning may be based, at least in part, one or more of capability of a participating device and/or a sidelink PRS type. In some instances, when a capability of a participating device indicates that the participating device is capable of supporting a shared resource pool for sidelink communication as specified in 3GPP Release 18 and beyond, a resource pool may be shared for communications with the participating device. In some instances, the UE may transmit, to the participating device, a first UE capability indicating whether or not the device is capable of supporting a shared resource pool for sidelink communication as specified in 3GPP Release 18 and beyond and receive, from the participating device, a second UE capability indicating whether or not the participating device is capable of supporting a shared resource pool for sidelink communication as specified in 3GPP Release 18 and beyond. Additionally, when the device and the participating device are both capable of supporting a shared resource pool for sidelink communication as specified in 3GPP Release 18 and beyond, the UE may use a shared resource pool for communication with the participating device. Further, when the device or the participating device is not capable of supporting a shared resource pool for sidelink communication as specified in 3GPP Release 18 and beyond, the UE may not use a shared resource pool for communication with the participating device.

In some instances, for a shared resource pool, additional signaling may be used to indicate resources that a PSSCH/PSFCH should avoid due to use by a sidelink PRS. For example, such use may be explicitly indicated by an indication of a length or duration of the PSSCH/PSFCH transmission, an indication of a size of the PSSCH/PSFCH, and/or an indication of the resources that should be avoided. Alternatively, such use may be implicitly indicated by a configuration of resources for the sidelink PRS.

In some instances, when a periodic or semi-persistent sidelink resource is configured as a shared resource, a sidelink PRS may be not be transmitted to participating devices that are not capable of supporting a shared resource pool for sidelink communication as specified in 3GPP Release 18 and beyond. In some instances, when a periodic or semi-persistent sidelink resource is configured as a shared resource, a sidelink PRS may not be transmitted when at least one participating device is not capable of supporting a shared resource pool for sidelink communication as specified in 3GPP Release 18 and beyond. The non-transmission of the sidelink PRS may be indicated in a sidelink control information (SCI) stage 1 and/or an SCI stage 2. In addition, a reserved bit in the SCI stage 1 and/or SCI stage 2 may indicate the non-transmission of the sidelink PRS. In some instances, when a periodic or semi-persistent sidelink resource is configured as a shared resource, only an aperiodic sidelink PRS may be transmitted in the shared resource.

Figure 13:
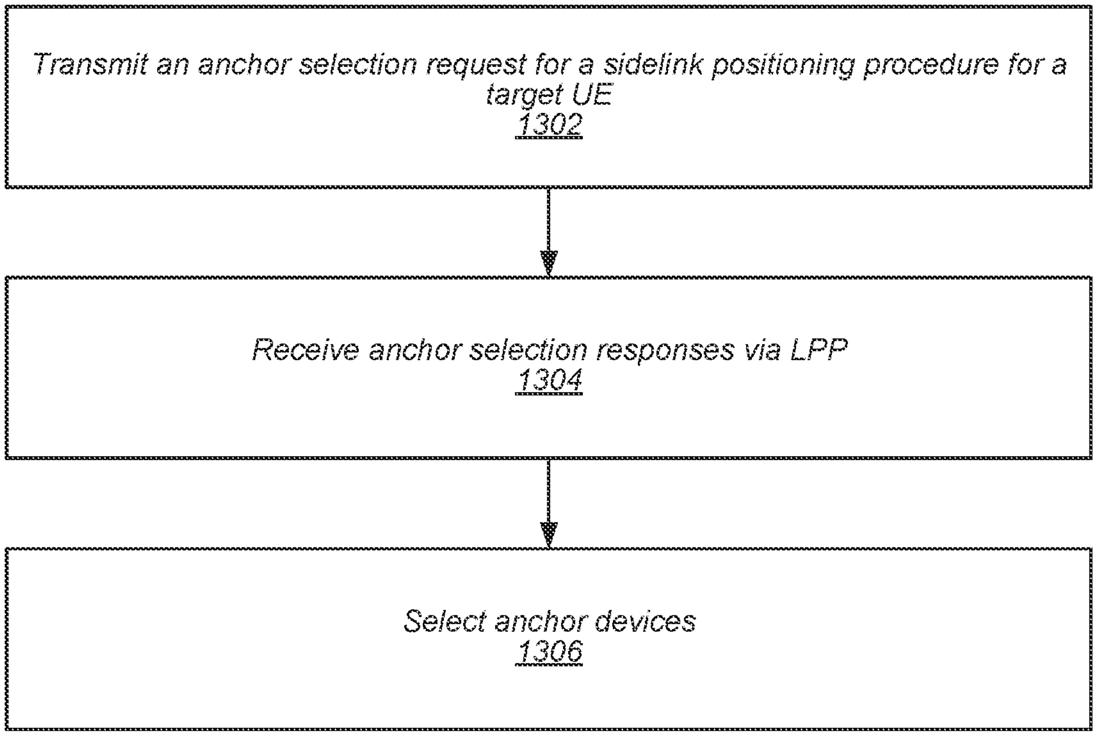

FIG. 13 illustrates a block diagram of a further example of a method for selecting a synchronization reference for sidelink positioning, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, an LMF, such as LMF 609, may transmit, to a plurality of wireless devices (e.g., such as sidelink UEs, PRUs, and other such devices), an anchor selection request for a sidelink positioning procedure for a target UE, which may be a UE 106. The anchor selection request may be sent individually to each of the plurality of wireless devices (e.g., as a unicast message) or broadcast to the plurality of wireless devices. Additionally, the anchor selection request may be transmitted via a MAC CE and/or via a higher layer using a sidelink Long Term Evolution (LTE) positioning protocol (LPP). The anchor selection request may include one or more of a preferred sidelink positioning type, a request for UE based or non-UE based positioning, a priority of a synchronization reference preferred for selection, a last known position of the target UE, and/or a change in position of the target UE since the last known position. The preferred sidelink positioning type may include one or more of a time difference of arrival (TDoA) procedure, a round trip time (RTT) procedure, sidelink Angle of Arrival (SL-AoA) procedure, sidelink Angle of Departure (SL-AoD) procedure, and/or sidelink enhanced cell identifier (SL e-CID) procedure.

At 1304, the LMF may receive, from one or more wireless devices of the plurality of wireless devices, an anchor selection response. In other words, at least a subset of the plurality of wireless devices may respond to the anchor selection request. The anchor selection response may be received via a higher layer using a sidelink LPP. The anchor selection response may include one or more of a unique UE identifier, a UE synchronization type, an anchor capability, a sidelink positioning type; a capability associated with synchronization switching, and/or a location availability indication. The UE synchronization type may include one or more of Global Navigation Satellite System (GNSS) based synchronization, synchronization signal block (SSB) based synchronization including an SSB identifier, sidelink SSB including a sidelink SSB identifier, and/or UE based synchronization. The sidelink positioning type may include one or more of TDoA procedure, an RTT procedure, an SL-AoA procedure, an SL-AoD procedure, and/or an SL e-CID procedure. The capability associated with synchronization switching may indicate whether a wireless device is open to switching synchronization sources. Further, the location availability indication may indicate whether a wireless device has a location and an indication of quality of location. In addition, the quality of location may indicate one or more of whether the location is based on a positioning reference unit (PRU), a base station, or a high capability UE and/or whether the wireless device is moving at a speed relative to the target UE.

At 1306, the LMF may select based, at least in part, on the anchor selection responses, one or more anchor devices from the one or more wireless devices. In some instances, to select, based, at least in part, on the anchor selection responses, the one or more anchor devices from the one or more wireless devices, the LMF may select the one or more anchor devices based on one or more of UE synchronization type, relative position of an anchor UE to the target UE, mobility, and/or signal quality. The UE synchronization type may include one or more of GNSS based synchronization, SSB based synchronization including an SSB identifier, sidelink SSB including a sidelink SSB identifier, and/or UE based synchronization. Note that GNSS based synchronization may be preferred over SSB based synchronization which may be preferred over sidelink SSB based synchronization which may be preferred over UE based synchronization. In some instances, to select, based, at least in part, on the anchor selection responses, the one or more anchor devices from the one or more wireless devices, the LMF may select wireless devices with a common synchronization reference as anchor devices.

In some instances, the LMF may determine that at least one wireless device of the one or more wireless devices has a different synchronization reference than at least one other wireless device of the one or more wireless devices. The device may request that the at least one wireless device switch synchronization references prior to selecting the at least one wireless device as an anchor device.

In some instances, the LMF may determine that at least one anchor device of the one or more anchor devices (e.g., a plurality of anchor devices) has a different synchronization reference than at least one other anchor device of the one or more anchor devices. The device may request a synchronization delta estimate for the one or more anchor devices. In such instances, received synchronization delta estimates may be used to correct for any synchronization differences amongst the one or more anchor devices.

In some instances, the LMF may determine that at least one anchor device of the one or more anchor devices (e.g., a plurality of anchor devices) has a different synchronization reference than at least one other anchor device of the one or more anchor devices. The device may modify the sidelink positioning procedure to accommodate differing synchronization references amongst the one or more anchor devices.

In some instances, the LMF may send, to the one or more anchor devices, a selection indication. The device may receive, from the one or more anchor devices, an acknowledgement. The selection indication may be transmitted via a higher layer using a sidelink LPP. Additionally, the acknowledgment may be received via a higher layer using a sidelink LPP.

In some instances, the LMF may request a location estimation for the target UE and determine a mobility state of the target UE. IN some instances, to determine the mobility state of the target UE, the LMF may determine that the target UE is mobile or not mobile relative to the one or more anchor devices based on estimating Doppler from a physical channel. In some instances, when the target UE is mobile relative to the one or more anchor devices, the LMF may transmit, to the target UE, a configuration for transmitting a sequence of sidelink PRSs at a predetermined interval to the one or more anchor devices. Further, the LMF may transmit, to the one or more anchor devices, a request for timestamp of arrival for received sidelink PRSs from the target UE and receive, from the one or more anchor devices, feedback associated with the received sidelink PRSs from the target UE. Additionally, the LMF may estimate the location of the target UE based of the feedback. The feedback may include the requested timestamp of arrival for received sidelink PRSs from the target UE. In some instances, to determine that the target UE is not mobile relative to the one or more anchor devices, the LMF may determine that the target UE is not moving. In some instances, to determine that the target UE is not mobile relative to the one or more anchor devices, the LMF may determine that the target UE is moving, that the one or more anchor devices are moving, and that the target UE and the one or more anchor devices are static with respect to one another. In some instances, when the target UE is not mobile relative to the one or more anchor devices, the LMF may transmit, to the target UE, a configuration for transmitting a sidelink PRS to each of the one or more anchor devices. Further, the LMF may transmit, to the one or more anchor devices, a request for timestamp of arrival for received sidelink PRSs from the target UE and receive, from the one or more anchor devices, feedback associated with the received sidelink PRSs from the target UE. Additionally, the LMF may estimate the location of the target UE based of the feedback. The feedback may include the requested timestamp of arrival for received sidelink PRSs from the target UE.

In some instances, a time-frequency resource allocation for sidelink positioning may be based, at least in part, one or more of capability of a participating device and/or a sidelink PRS type. In some instances, when a capability of a participating device indicates that the participating device is capable of supporting a shared resource pool for sidelink communication as specified in 3GPP Release 18 and beyond, a resource pool may be shared for communications with the participating device.

In some instances, for a shared resource pool, additional signaling may be used to indicate resources that a PSSCH/PSFCH should avoid due to use by a sidelink PRS. For example, such use may be explicitly indicated by an indication of a length or duration of the PSSCH/PSFCH transmission, an indication of a size of the PSSCH/PSFCH, and/or an indication of the resources that should be avoided. Alternatively, such use may be implicitly indicated by a configuration of resources for the sidelink PRS.

In some instances, when a periodic or semi-persistent sidelink resource is configured as a shared resource, a sidelink PRS may be not be transmitted to participating devices that are not capable of supporting a shared resource pool for sidelink communication as specified in 3GPP Release 18 and beyond. In some instances, when a periodic or semi-persistent sidelink resource is configured as a shared resource, a sidelink PRS may not be transmitted when at least one participating device is not capable of supporting a shared resource pool for sidelink communication as specified in 3GPP Release 18 and beyond. The non-transmission of the sidelink PRS may be indicated in a sidelink control information (SCI) stage 1 and/or an SCI stage 2. In addition, a reserved bit in the SCI stage 1 and/or SCI stage 2 may indicate the non-transmission of the sidelink PRS. In some instances, when a periodic or semi-persistent sidelink resource is configured as a shared resource, only an aperiodic sidelink PRS may be transmitted in the shared resource.

Figure 14:
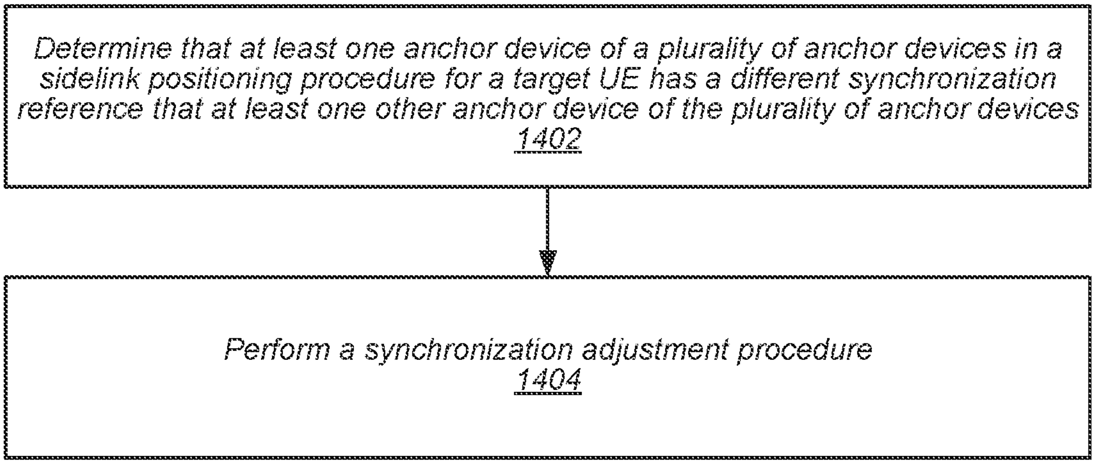
FIG. 14 illustrates a block diagram of a further example of a method for determining synchronization references of anchor devices in a sidelink positioning procedure for a target UE, according to some embodiments.

FIG. 14 illustrates a block diagram of a further example of a method for determining synchronization references of anchor devices in a sidelink positioning procedure for a target UE, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a device, such as an LMF (e.g., LMF 609) or a UE (e.g., UE 106), may determine that at least one anchor device of one or more anchor devices (e.g., a plurality of anchor devices) in a sidelink positioning procedure for a target UE has a different synchronization reference than at least one other anchor device of the one or more anchor devices.

At 1404, the device may perform, e.g., based on the determination, a synchronization adjustment procedure. In some instances, to perform the synchronization adjustment procedure, the device may request that the at least one anchor device switch synchronization references prior to performing the sidelink positioning procedure. In some instances, to perform the synchronization adjustment procedure, the device may request a synchronization delta estimate from each of the one or more anchor devices. The received synchronization delta estimates may be used by the device to correct for any synchronization differences amongst the one or more anchor devices. In some instances, to perform the synchronization adjustment procedure, the device may modify the sidelink positioning procedure to accommodate differing synchronization references amongst the one or more anchor devices.

In some instances, the device may transmit, to a plurality of wireless devices, an anchor selection request for the sidelink positioning procedure for the target UE. Additionally, the device may receive, from one or more wireless devices of the plurality of wireless devices, an anchor selection response and select based, at least in part, on the anchor selection responses, the one or more anchor devices from the one or more wireless devices. In some instances, to transmit the anchor selection request, the device may broadcast the anchor selection request to the plurality of wireless devices. The anchor selection request may be transmitted via a physical layer in SCI, via a MAC CE, and/or via a higher layer using sidelink LPP. In some instances, the anchor selection request may include at least one or more of a preferred sidelink positioning type, a request for UE based or non-UE based positioning, a priority of a synchronization reference preferred for selection, a last known position of the target UE, and/or a change in position of the target UE since the last known position. In some instances, the preferred sidelink positioning type may include at least one or more of time difference of arrival (TDoA), round trip time (RTT), sidelink Angle of Arrival (SL-AoA), sidelink Angle of Departure (SL-AoD), and/or sidelink enhanced cell identifier (SL e-CID). In some instances, the anchor selection response may be received via a physical layer channel, via a MAC CE, or via a higher layer using sidelink LPP. The physical layer channel may be a control channel. Further, the control channel may be a physical sidelink control channel (PSCCH) or a control channel dedicated for positioning control. The PSCCH may include a dedicated slot for positioning for a sidelink positioning reference signal. In some instances, the anchor selection response may include at least one or more of a unique UE identifier, a UE synchronization type, an anchor capability, a sidelink positioning type, a capability associated with synchronization switching, and/or a location availability indication. The UE synchronization type may include at least one or more of Global Navigation Satellite System (GNSS) based synchronization, synchronization signal block (SSB) based synchronization including an SSB identifier, sidelink SSB including a sidelink SSB identifier, and/or UE based synchronization. Further, the sidelink positioning type may include at least one or more of TDoA, RTT, SL-AoA, SL-AoD, and/or SL e-CID. In some instances, the capability associated with synchronization switching may indicate whether a wireless device is open to switching synchronization sources. In some instances, the location availability indication may indicate whether a wireless device has a location and an indication of quality of location. Further, the quality of location may indicate one or more of whether the location is based on a positioning reference unit (PRU), a base station, or a high capability UE and/or whether the wireless device is moving at a speed relative to the target UE.

In some instances, to select based, at least in part, on the anchor selection responses, the one or more anchor devices from the one or more wireless devices, the device may select the one or more anchor devices based on one or more of UE synchronization type, relative position of an anchor UE to the target UE, and/or signal quality. The UE synchronization type may include at least one or more of GNSS based synchronization, SSB based synchronization including an SSB identifier, sidelink SSB including a sidelink SSB identifier, and/or UE based synchronization. Additionally, GNSS based synchronization may be preferred over SSB based synchronization, SSB based synchronization may be preferred over sidelink SSB based synchronization, and sidelink SSB based synchronization may be preferred over UE based synchronization.

In some instances, to select based, at least in part, on the anchor selection responses, the one or more anchor devices from the one or more wireless devices, the device may only select wireless devices with a common synchronization reference as anchor devices.

In some instances, the device may be the target UE. In such instances, the device may request a location estimation for the target UE and determine a mobility state of the target UE. In some instances, to determine the mobility state of the target UE, the device may indicate, to an LMF (e.g., LMF 609), that the target UE is mobile or not mobile relative to the one or more anchor devices and/or determine that the target UE is mobile or not mobile relative to the one or more anchor devices based on a trigger or location request. In some instances, when the target UE is mobile relative to the one or more anchor devices, the device may receive, from the LMF, a configuration for transmitting a sequence of sidelink positioning reference signals (PRSs) at a predetermined interval to the one or more anchor devices and transmit, to the one or more anchor devices, the sequence of sidelink PRSs at the predetermined interval. In some instances, to determine that the target UE is not mobile relative to the one or more anchor devices, the device may determine that the target UE is not moving. In some instances, to determine that the target UE is not mobile relative to the one or more anchor devices, the device may determine that the target UE is moving, determine that the one or more anchor devices are moving, and determine that the target UE and the one or more anchor devices are static with respect to one another. Further, when the target UE is not mobile relative to the one or more anchor devices, the device may receive, from the LMF, a configuration for transmitting a sidelink PRSs to each of the one or more anchor devices and transmit, to each of the one or more anchor devices, the sidelink PRS.

In some instances, the device may be the LMF. In such instances, the device may request a location estimation for the target UE and determine a mobility state of the target UE. In some instances, to determine the mobility state of the target UE, the device may determine that the target UE is mobile or not mobile relative to the one or more anchor devices based on estimating Doppler from a physical channel. Further, when the target UE is mobile relative to the one or more anchor devices, the device may transmit, to the target UE, a configuration for transmitting a sequence of sidelink PRSs at a predetermined interval to the one or more anchor devices and transmit, to the one or more anchor devices, a request for timestamp of arrival for received sidelink PRSs from the target UE. Additionally, the device may receive, from the one or more anchor devices, feedback associated with the received sidelink PRSs from the target UE and estimate the location of the target UE based of the feedback. The feedback may include the requested timestamp of arrival for received sidelink PRSs from the target UE. In some instances, to determine that the target UE is not mobile relative to the one or more anchor devices, the device may determine that the target UE is not moving. In some instances, to determine that the target UE is not mobile relative to the one or more anchor devices, the device may determine that the target UE is moving, determine that the one or more anchor devices are moving, and determine that the target UE and the one or more anchor devices are static with respect to one another. Additionally, when the target UE is not mobile relative to the one or more anchor devices, the device may transmit, to the target UE, a configuration for transmitting a sidelink PRSs to each of the one or more anchor devices and transmit, to the one or more anchor devices, a request for timestamp of arrival for received sidelink PRSs from the target UE. Further, the device may receive, from the one or more anchor devices, feedback associated with the received sidelink PRSs from the target UE and estimate the location of the target UE based of the feedback. The feedback may include the requested timestamp of arrival for received sidelink PRSs from the target UE.

In some instances, a time-frequency resource allocation for sidelink positioning may be based, at least in part, on one or more of capability of a participating device and/or a sidelink PRS type. In some instances, when the capability of a participating device indicates that the participating device is capable of supporting a shared resource pool for sidelink communication as specified in 3GPP Release 18 and beyond, a resource pool may be shared for communications with the participating device. Additionally, the device may transmit, to the participating device, a first UE capability indicating whether or not the device is capable of supporting a shared resource pool for sidelink communication as specified in 3GPP Release 18 and beyond and receive, from the participating device, a second UE capability indicating whether or not the participating device is capable of supporting a shared resource pool for sidelink communication as specified in 3GPP Release 18 and beyond. Further, when the device and the participating device are both capable of supporting a shared resource pool for sidelink communication as specified in 3GPP Release 18 and beyond, the device may use a shared resource pool for communication with the participating device and, when the device or the participating device is not capable of supporting a shared resource pool for sidelink communication as specified in 3GPP Release 18 and beyond, the device may not use a shared resource pool for communication with the participating device.

In some instances, when a periodic or semi-persistent sidelink resource is configured as a shared resource, the device may not transmit a PRS to participating devices that are not capable of supporting a shared resource pool for sidelink communication as specified in 3GPP Release 18 and beyond.

In some instances, when a periodic or semi-persistent sidelink resource is configured as a shared resource, the device may not transmit a PRS when at least one participating device is not capable of supporting a shared resource pool for sidelink communication as specified in 3GPP Release 18 and beyond. In some instances, the device may indicate the non-transmission of the sidelink PRS in an SCI stage 1 and/or an SCI stage 2. In some instances, a reserved bit in the SCI stage 1 and/or SCI stage 2 may indicate the non-transmission of the sidelink PRS.

In some instances, when a periodic or semi-persistent sidelink resource is configured as a shared resource, the device may only transmit an aperiodic PRS in the shared resource.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, performed by a user equipment device (UE), for selecting a synchronization reference for sidelink positioning, comprising:

transmitting, to a plurality of wireless devices, an anchor selection request for a sidelink positioning procedure for a target UE;

receiving, from one or more wireless devices of the plurality of wireless devices, an anchor selection response that includes information indicative of synchronization-reference characteristics associated with each wireless device of the one or more wireless devices, wherein the synchronization-reference characteristics include at least one of a synchronization source identifier, a relative time difference, or synchronization quality information; and selecting, based, at least in part, on the synchronization-reference characteristics included in the anchor selection responses, one or more anchor devices from the one or more wireless devices that satisfy a synchronization-reference criterion.

2. The method of claim 1, wherein the information indicative of synchronization-reference characteristics associated with each wireless device of the one or more wireless devices included in the anchor selection response includes a UE synchronization type, and wherein the UE synchronization type includes at least one or more of:

Global Navigation Satellite System (GNSS) based synchronization;

synchronization signal block (SSB) based synchronization including an SSB identifier;

sidelink SSB including a sidelink SSB identifier; and/or

UE based synchronization.

3. The method of claim 1, wherein the information indicative of synchronization-reference characteristics associated with each wireless device of the one or more wireless devices included in the anchor selection response includes a capability associated with synchronization switching, and wherein the capability associated with synchronization switching indicates whether a wireless device is open to switching synchronization sources.

4. The method of claim 1, wherein the synchronization-reference characteristics include a relative time difference between synchronization references of at least two wireless devices.

5. The method of claim 1, wherein the anchor selection response includes one or more fields corresponding to the synchronization-reference characteristics.

6. The method of claim 1, wherein selecting the one or more anchor devices comprises comparing synchronization-reference characteristics across anchor selection responses received from the one or more wireless devices.

7. The method of claim 1, wherein the synchronization-reference criterion includes selecting wireless devices having a relative time difference less than a threshold.

8. The method of claim 1, wherein selecting the one or more anchor devices comprises ranking the one or more wireless devices based on synchronization quality information.

9. The method of claim 1, wherein selecting the one or more anchor devices comprises excluding wireless devices having synchronization sources different from synchronization sources associated with other candidate anchor devices.

10. The method of claim 1, wherein selecting the one or more anchor devices comprises selecting wireless devices based on synchronization delta information associated with synchronization differences between the wireless devices.

11. An apparatus, comprising:

a memory; and at least one processor in communication with the memory and configured to:

generate instructions to transmit, to a plurality of wireless devices, an anchor selection request for a sidelink positioning procedure for a target user equipment device (UE);

receive, from one or more wireless devices of the plurality of wireless devices, an anchor selection response that includes information indicative of synchronization-reference characteristics associated with each wireless device of the one or more wireless devices, wherein the synchronization-reference characteristics include at least one of a synchronization source identifier, a relative time difference, or synchronization quality information; and select, based, at least in part, on the synchronization-reference characteristics included in the anchor selection responses, one or more anchor devices from the one or more wireless devices that satisfy a synchronization-reference criterion.

12. The apparatus of claim 11, wherein, to select based, at least in part, on the anchor selection responses, the one or more anchor devices from the one or more wireless devices, the at least one processor is further configured to only select wireless devices with a common synchronization reference as anchor devices.

13. The apparatus of claim 11, wherein the at least one processor is further configured to disregard one or more anchor selection responses that do not include synchronization-reference characteristics.

14. The apparatus of claim 11, wherein the at least one processor is further configured to perform a first selection of candidate anchor devices based on synchronization-reference characteristics and a second selection of anchor devices based on signal quality or relative position associated with the candidate anchor devices.

15. The apparatus of claim 11, wherein the at least one processor is further configured to select the one or more anchor devices such that relative time differences between synchronization references of the one or more anchor devices satisfy a threshold prior to performing the sidelink positioning procedure.

16. A device, comprising:

a memory;

at least one network interface; and one or more processors, in communication with the memory and the at least one network interface, configured to cause the device to:

transmit, to a plurality of wireless devices, an anchor selection request for a sidelink positioning procedure for a target user equipment device (UE);

receive, from one or more wireless devices of the plurality of wireless devices, an anchor selection response that includes information indicative of synchronization-reference characteristics associated with each wireless device of the one or more wireless devices, wherein the synchronization-reference characteristics include at least one of a synchronization source identifier, a relative time difference, or synchronization quality information; and select, based, at least in part, on the synchronization-reference characteristics included in the anchor selection responses, one or more anchor devices from the one or more wireless devices that satisfy a synchronization-reference criterion.

17. The device of claim 16, wherein the one or more processors are further configured to cause the device to:

determine that at least one wireless device of the one or more wireless devices has a different synchronization reference than at least one other wireless device of the one or more wireless devices; and request that the at least one wireless device switch synchronization references prior to selecting the at least one wireless device as an anchor device.

18. The device of claim 16, wherein the one or more processors are further configured to cause the device to:

determine that at least one anchor device of the one or more anchor devices has a different synchronization reference than at least one other anchor device of the one or more anchor devices; and request a synchronization delta estimate for the one or more anchor devices, wherein received synchronization delta estimates are used to correct for any synchronization differences amongst the one or more anchor devices.

19. The device of claim 16, wherein the one or more processors are further configured to update selection of the one or more anchor devices based on updated synchronization-reference characteristics received from the one or more wireless devices.

20. The device of claim 16, wherein the one or more processors are further configured to transmit feedback to one or more wireless devices requesting modification of synchronization references associated with the one or more wireless devices.

* * * * *